Nov. 27, 1962
W. E. HERRMANN
3,065,932
ANNULAR WING AIRCRAFT
Filed Nov. 18, 1959
2 Sheets-Sheet 1
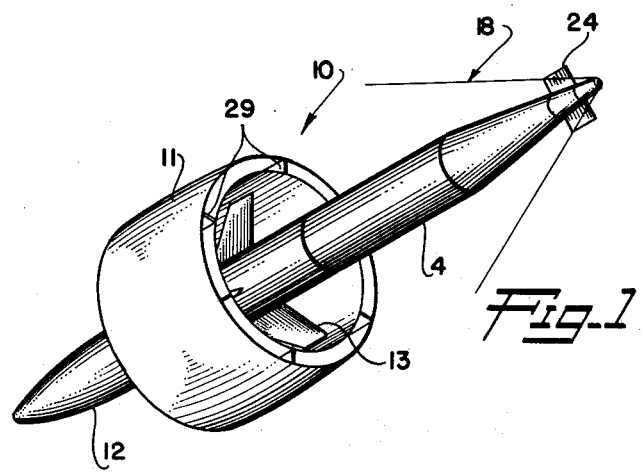
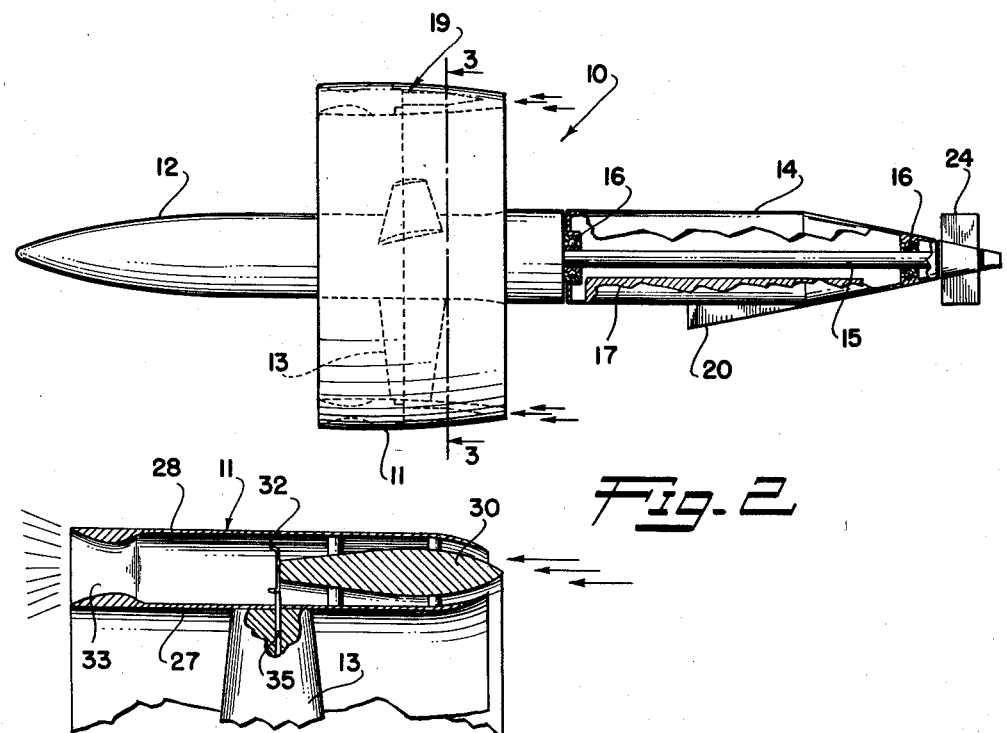
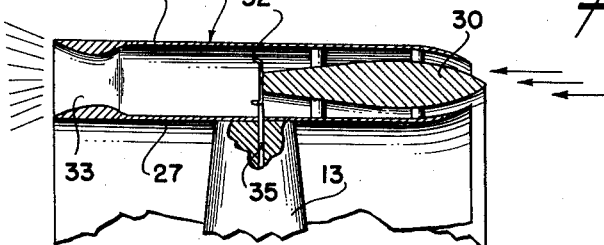
INVENTOR.
WERNER E. HERRMANN
BY
*George C. Sullivan*
Agent Nov. 27, 1962 W. E. HERRMANN 3,065,932
ANNULAR WING AIRCRAFT
Filed Nov. 18, 1959 2 Sheets-Sheet 2

INVENTOR.
WERNER E. HERRMANN
BY
George Sullivan
Agent

3,065,932
ANNULAR WING AIRCRAFT
Werner E. Herrmann, Northridge, Calif., assignor to Lockheed Aircraft Corporation, Burbank, Calif.
Filed Nov. 18, 1959, Ser. No. 853,809
4 Claims. (Cl. 244—15)

The present invention relates to an aircraft, more particularly to an aircraft utilizing a spinning annular wing for purposes of lift and stability. Even more particularly, it relates to propulsion means for a spinning annular wing aircraft.

The annular wing aircraft is known to be old in the art, as evidenced by my German Patent Number 726,969, dated September 17, 1942. Its advantage is that it combines lift and stability in a simple airframe. The upper and lower sections of the rotating annular wing provide necessary lift and its spinning about its central axis stabilizes the airframe by the gyroscopic effect. The spinning annular wing as disclosed in my German patent mentioned above had no means of propulsion. After the original launch momentum had been expended, flight was soon terminated.

Several attempts have since been made to provide propulsion means for the annular wing so that flight could be maintained. Some efforts have been made to utilize the interior surface of the wing as the shell for a ramjet engine, that is, the interior of the wing itself defined the diffuser and combustion chamber of the ramjet engine. This design has limited application because of the limited ratio between diameter and length of a ramjet engine. Because of this limitation on aerodynamic design, the lift contribution is limited for a given thrust. A second disadvantage of using the annulus of the wing as a diffuser and combustion chamber is that the trailing edge of the wing defines the engine exhaust, thereby precluding the carrying of fuel or instruments in a center aft extending body because of the extreme heat. The forward extension of the center body would also be limited because of balance problems.

One means of propulsion involves the use of a rocket engine in the aft end of a center body as disclosed in my copending application, Serial Number 853,866 for a "Control System for Annular Wing Aircraft" dated November 18, 1959. The obvious disadvantage of using rocket propulsion is its cost and short range. This detracts from the advantages of the simplicity and lower cost of the annular wing configuration.

It is thus an important object of this invention to provide propulsion means for an annular wing aircraft.

It is another object of this invention to provide a simplified fuel system for the propulsion means of an annular wing aircraft. Centrifugal forces of the spinning annular wing are utilized to provide pressure to propel fuel from a central fuel container to the propulsion means.

It is another object of this invention to provide an annular wing aircraft propulsion means which does not limit the aerodynamic design of the annular wing. The dimensions of the wing are not restricted by the length-diameter ratio limits of the propulsion device.

It is another object of this invention to provide propulsion means for an annular wing aircraft which utilizes the unique control system as disclosed in my co-pending application, Serial Number 853,866.

It is further an object of this invention to provide an annular wing aircraft capable of supersonic flight which has a configuration such that the wing and powerplant are shrouded by the shock envelope from the nose of the aircraft. Further objects will become apparent from the reading of the following specification, especially when examined in conjunction with the appended drawings.

FIG. 1 is a perspective view of the annular wing aircraft according to the present invention. The general position of the shock envelope in relation to the annular wing during supersonic flight is indicated schematically.

FIG. 2 shows a side view of the annular wing aircraft according to the present invention which utilizes ramjet engine means in the wing and shows the control means as disclosed in my co-pending application, Serial Number 853,866.

FIG. 5 is a cross-sectional view of the annular wing showing internally mounted ramjet means with an oblique shock inlet.

Figure 3:
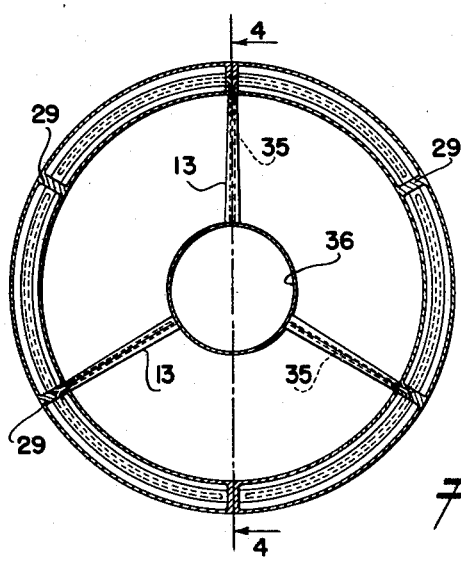
FIG. 3 shows an enlarged view of the aft section of the aircraft as shown in FIG. 2 taken on lines 3—3 of FIG. 2.

FIG. 1 shows how the aircraft according to the present invention will appear in flight with the shock envelope 18 created by the nose extending around and beyond the annular wing 11. The theoretical ideal relation between the shock envelope from the nose and the annular wing in which there is ramjet engine means is that it exactly intercepts the leading edge wherein is mounted the intake for the ramjets. In practice, the angle of the envelope will vary due to changing speeds and attitudes resulting in widely varying velocities at the air intake and thus devious engine efficiencies. This will aggravate the changing speed and engine inefficiencies resulting in an erratic flight and an extremely difficult control problem. Because the intake air must be slowed to subsonic speeds in the ramjet before it is mixed with fuel, an air diffuser 30, centrally positioned on supports 31, is necessary. The faster the speed of relative air at the inlet, the larger must be the diffuser which further restricts the inlet size. Behind the shock envelope, the velocities of relatively moving air are reduced. By extending the nose of the aircraft to extend the shock envelope around the wing, a cascade effect is created. The velocity of the relatively moving wing is reduced behind the shock envelope, then reduced further by the engine diffuser. Where the velocity is still supersonic behind the envelope, an oblique shock inlet as shown in FIG. 5 is used. Thus, by avoiding interception of the wing with the shockwave envelope, the design of the annular wing and the propulsion means within it can be simplified.

FIG. 2 shows the general arrangement of the annular wing aircraft 10 according to the present invention. The annular wing 11 containing ramjet engines 19 is fixed to the longitudinal main body 12 by the canted vanes 13. Movement of relative air through the vanes 13 will cause the body and the annular wing to rotate about the central axis. The front body 14, hereafter called the pendulum body, is rotatably mounted on shaft 15 which is fixed to the front of the main body 12 at its axis. The low friction bearings 16 on each end of shaft 15 allow for free rotation of the shaft within the body 14. The body 14 is retained in a stationary position with respect to the plane of earth's gravity by the pendulum weight 17 which places the center of gravity of body 14 below its axis defined by shaft 15. In order that the pendulum body 14 remain vertical during turns, a fin 20 is provided on the lower side of the pendulum body 14 which may be extended or fixed in position so that the lateral aerodynamic forces imposed on it will oppose movement of the pendulum weight 17 in the opposite direction about the shaft 15. The spinning of the body 12 and the annular wing 11 creates a gyroscopic effect which is utilized to cause the aircraft to change its attitude in space. This is done by applying a force perpendicular to the nose end of the spin axis of the aircraft at 90 degrees to the desired change of either attitude or course. By applying this moment, the gyro formed by the spinning wing and aircraft is caused to precess.

The means by which the control force is imposed is shown in FIG. 2 as a rotating control surface 24. Control surface 24 rotates on the pendulum body 14 and has two vanes canted with respect to the longitudinal axis of the aircraft; one vane is canted slightly more than the other vane. When stopped, the vane with the larger cant will cause a greater moment about the longitudinal axis of the aircraft. In straight and level flight, the surface 24 is allowed to rotate freely. When a change in heading or pitch is desired, the surface 24 is stopped in the proper plane with respect to the pendulum body 14. The sum of the aerodynamic forces of the vanes of control surface 24 will cause a moment against the end of the aircraft which will cause the spinning wing 11 and body 12 to precess the aircraft to the desired attitude or heading. Instead of the rotating control surface 24 as shown in FIG. 2, the conventional cruciform-type of control surface or a ram air deflector may be used.

Figure 4:
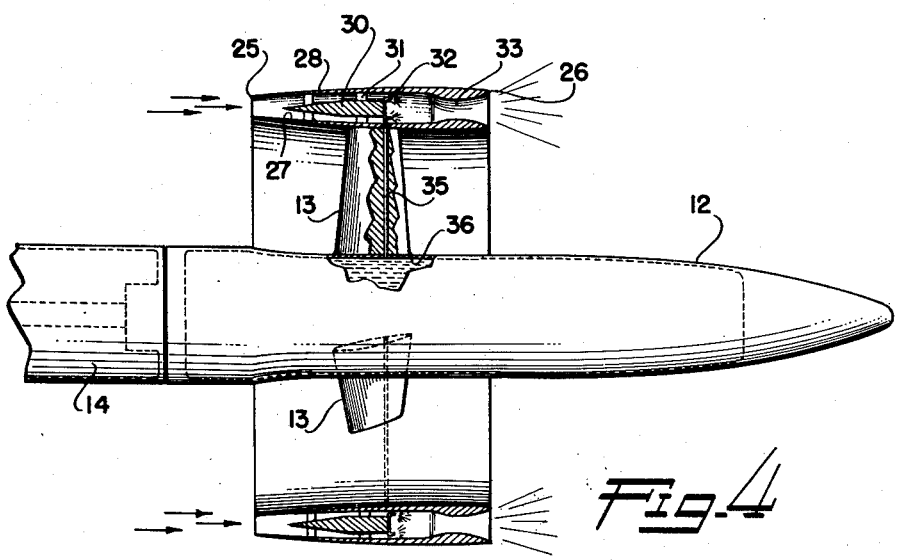
FIG. 4 is a view of the aft end of the aircraft showing in section the annular ramjet engine means with a normal shock inlet taken on lines 4—4 of FIG. 3.

As can be seen from FIGS. 3 and 4, the annular wing according to the present invention has a leading edge 25, a trailing edge 26, an interior surface 27 and an exterior surface 28. Spaced arcuately around the wing are partitions 29 extending from the leading to the trailing edge which divide the annular area defined by the interior and exterior surfaces and the leading and trailing edges of the wing. Within each one of these sections is an arcuate ramjet engine 19 which includes a diffuser 30, fuel spray nozzles 32 and an exhaust nozzle 33. Fuel for the engines is supplied through the fuel lines 35 from the fuel container 36 in the main body of the aircraft 12. It will be observed that when the canted vanes 13 cause rotation of the main body and the annular wing, the centrifugal forces created will force the fuel through the lines 35 resulting in atomization at spray nozzles 32, thereby obviating the need for a fuel pressure system. Thus the simplicity of the fuel system is in keeping with the overall simplicity of the annular wing design.

Improvements have been provided for an annular wing aircraft which are efficient in their operation yet are in keeping with the advantage of simplicity of the annular wing configuration. Propulsion means have been provided which do not restrict the aerodynamic design.

By placing the propulsion means in the annular wing, the center body may be extended aft due to the spacing of the exhaust from it. The center body may therefore be extended forward of the wing a greater distance because of the balance provided by the aft extension. This permits extending of the main body of the aircraft far enough forward so that the shock envelope created in supersonic flight by that forward extremity will not intercept the annular wing, alleviating the problems encountered when such a shock envelope varies about the wing.

Further advantages result from placing of the ramjet engines in the annular wing. Heat from the engines transmitted through the exterior surfaces of the wing add energy to the boundary layer, thereby decreasing friction drag across the wing.

By placing the engine in the wing, the drag of a separately mounted engine is eliminated. The base drag of the wing itself is eliminated. Base drag is caused by the area of low pressure which follows any object moving through a compressible fluid. The exhaust of the ramjets fill this low pressure area eliminating the base drag.

It is to be understood that certain substitutions, alterations and additions may be made within the scope of the appended claims without departing from the spirit of the disclosed invention.

What is claimed is:

1. An aircraft having a longitudinal body at its central axis, radially extending canted vanes on said longitudinal body intermediate its ends, an annular wing having its axis coincidental with the central axis and being mounted on said canted vanes, said annular wing having a leading edge, a trailing edge, an interior surface facing said central axis and an exterior surface facing away from said central axis, annular propulsion means within said wing between said interior surface and said exterior surface, air inlet means around the circumference of said leading edge of said annular wing, and exhaust means around the circumference of said trailing edge for said propulsion means, a fuel container in said longitudinal body, conduit means from said fuel container extending radially through said vane means to said propulsion means in said annular wing so that rotation of said aircraft caused by relatively moving air across said canted vanes will stabilize said aircraft and provide centrifugal force for said fuel to said propulsion means.

2. An aircraft having a longitudinal body at its central axis, radially extending canted vanes on said body intermediate its ends, an annular wing having its axis coincidental with said central axis and being mounted on said canted vanes, said annular wing having a leading edge, a trailing edge, an interior surface facing said central axis and an exterior surface, an annular ram-jet engine in said wing, the interior surface and exterior surface of said annular wing defining the walls of said annular ram-jet engine, air inlet means around the circumference of said leading edge of said annular wing, exhaust means for said ram-jet engine around the circumference of said trailing edge of said annular wing, a fuel container in said longitudinal body, conduit means from said fuel container to said annular ram-jet engine so that when said aircraft is caused to rotate due to the reaction from relatively moving air parallel to the central axis of said aircraft, centrifugal force will cause said fuel in said fuel container to be forced outwardly through said conduit means to said annular ram-jet engine obviating necessity for auxiliary fuel pressure means.

3. An aircraft having a longitudinal body at its central axis, radially extending canted vanes on said body intermediate its ends, an annular wing having its axis coincidental with said central axis and being mounted on said canted vanes, said annular wing having a leading edge, a trailing edge, an interior surface facing said central axis and an exterior surface, said annular wing being divided into arcuate sections with partition means approximately parallel to said central axis between each section, an arcuate ram-jet engine within each section, said exterior and said interior surfaces of said annular wing and said partitions forming the walls of said arcuate ram-jet engine, air inlet means at said leading edge of said annular wing, exhaust means for said ram-jet engine at said trailing edge of said annular wing, a fuel container in said longitudinal body, conduit means from said fuel container extending radially through said canted vanes to said ram-jet engines in said annular wing.

4. An aircraft having a central axis and a main body, canted vanes extending radially from said main body, an annular wing mounted on said vanes having its axis coincidental with said central axis, said canted vanes causing rotation of said wing and said main body in response to relatively moving air, a pendulum body mounted for relative rotation with said main body about its said central axis, said pendulum body having its center of gravity below said central axis, a fin mounted on said pendulum body in a plane defined by said central axis in said center of gravity of said pendulum body, a control surface on said pendulum body, means to cause said control surface to impose a lateral force against an end of said central axis in response to deviations in altitude or course, propulsion means comprised of annular ram-jet engines arcuately spaced within the interior and exterior surface of said annular wing, the leading edge of said annular wing having air inlet means for said ram-jet engine and the trailing edge having exhaust means for said ram-jet engine, said main body having a fuel container, conduit means from said fuel container to said ram-jet engine means in said annular wing so that rotation of said wing and said main body will cause stabilization of said aircraft and centrifugal force for said fuel from said fuel container to said ram-jet engine.

References Cited in the file of this patent

UNITED STATES PATENTS

| | | |
|---|---|---|
| 2,691,495 | Chiroky | Oct. 12, 1954 |
| 2,907,536 | Von Zborowski | Oct. 6, 1959 |

FOREIGN PATENTS

| | | |
|---|---|---|
| 289,771 | Germany | Jan. 18, 1916 |
| 726,969 | Germany | Oct. 23, 1942 |
| 719,763 | Great Britain | Dec. 8, 1954 |
| 1,158,452 | France | June 16, 1958 |